Oct. 19, 1954      L. A. DAVIS      2,692,043
SPECTACLE CASE
Filed Aug. 6, 1953
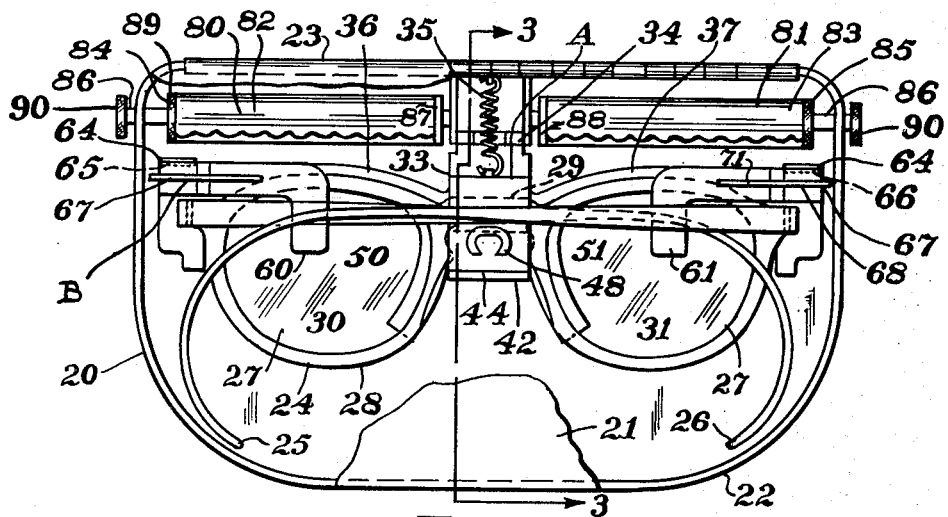
Fig. 1.
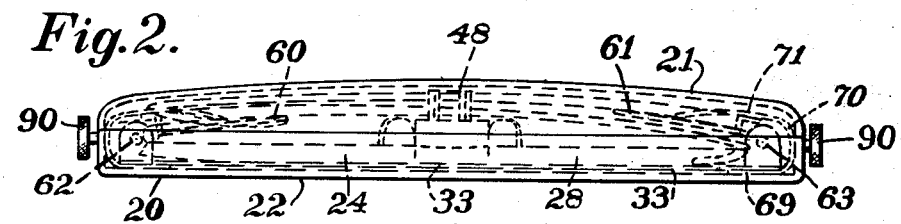
Fig. 2.
Fig. 3.
Fig. 4.
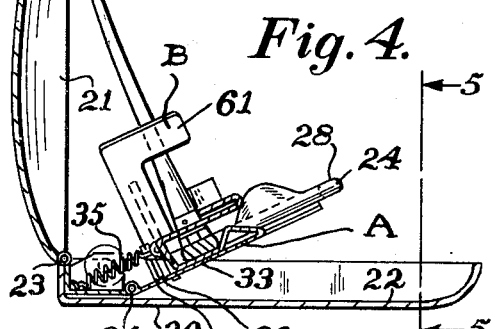
Fig. 5.
INVENTOR.
LILLIAN A. DAVIS
BY
Pearson + Pearson
ATTORNEYS

Patented Oct. 19, 1954

2,692,043

UNITED STATES PATENT OFFICE 2,692,043

SPECTACLE CASE

Lillian A. Davis, Haverhill, Mass.

Application August 6, 1953, Serial No. 372,683

9 Claims. (Cl. 206—6)

This invention relates to pocket cases for carrying a pair of spectacles.

Such cases usually are formed by a pair of dished covers of substantially rigid material, connected by a spring hinge along one edge, and of a suitable shape and size to enclose a pair of spectacles with the bows folded down across the lenses and bridge. Cushioning material has sometimes been positioned in such cases to prevent the spectacles from moving when the covers are closed and lens cleaning material has sometimes been provided as a built-in case lining or the like.

It has required considerable time and effort to reach into such cases, secure a grip on the bridge, or folded bows of the spectacles, separate them from the case, unfold the bows, secure a chamois or other lens cleaning material, and finally wipe the lenses before donning the spectacles.

The principal object of this invention is to expedite the above operation by automatically presenting the spectacles to the user, upon opening the case, with the bows unfolded and the eyeglasses lifted into position for rapid removal or cleaning of the lenses thereof.

Another object of the invention is to provide lens cleaning material in rolled form in the case, positioned to be rapidly and easily available for wiping the lenses of the spectacles when the case is opened and the spectacles presented as above.

A further object of the invention is to provide a support for the eyeglasses and supports for the bows which are placed under spring pressure when the spectacles are enclosed in the case and which unfold the bows and lift the eyeglasses partly out of the case when the case cover, or covers, are opened. Thus the opening of the case presents the spectacles in condition to be easily grasped and instantly worn.

Still another object of the invention is to provide such spring actuated eyeglasses and bow supports in a form in which they press the spectacles against a cover when the case is closed thereby firmly retaining the same in position within the case.

A still further object of the invention is to provide such spring actuated supports in the form of bendable sheet material which can be manually shaped by the user to accommodate a particular pair of spectacles and thereafter retain its form.

In the accompanying drawing,

Fig. 1 is a plan view of a spectacle case constructed in accordance with the invention with the cover broken away and a pair of spectacles shown in full lines.

Fig. 2 is a front view of the device shown in Fig. 1.

Fig. 3 is a side view in section on line 3—3 of Fig. 1.

Fig. 4 is a side view similar to Fig. 3 on line 3—3 of Fig. 1 but with the case open.

Fig. 5 is a fragmentary front elevation in section on line 5—5 of Fig. 4.

In the drawing the spectacle case 20 includes a pair of dished covers 21 and 22 joined along adjacent longitudinal edges by a cover hinge 23 in a well known manner. Preferably the hinge 23 is of the type which causes the covers to snap shut and snap open also, in a well known manner. Covers 21 and 22 may be of any desired shape capable of enclosing a pair of spectacles but form a case slightly wider than normal in order to accommodate the mechanism of this invention. The covers 21 and 22 are of rigid, self supporting material and preferably the interior of the case is lined with soft fabric in the usual manner.

A typical pair of spectacles 24 is shown, the spectacles having a pair of bows 25 and 26, hingedly pivoted at opposite sides of the eyeglasses 27. Eyeglasses 27 include a frame 28, a nose bridge 29 and a pair of lenses 30 and 31.

Spring-actuated, eyeglasses-holding, mechanism A is provided in case 20 including an elongated eyeglasses support 33 an eyeglasses support hinge 34 and first spring means 35. The eyeglasses support 33 extends longitudinally of case 20 and of covers 21 and 22 and preferably is co-extensive therewith. In the embodiment shown, the eyeglasses support 33 is less than half the width of case 20 and, in any case, it is of sufficient length and width, and of sufficiently rigid material, to form a support or platform on which a pair of spectacles may rest and be lifted to an inclined position. Preferably the eyeglasses support hinge 34 is centrally disposed of the support 33 and is comparatively short in length thereby leaving the opposite ends 36 and 37 of support 33 free for a purpose to be explained hereafter. Support hinge 34 extends parallel to cover hinge 23 and is mounted near cover hinge 23 on a cover such as 22. A coil spring such as 35, or equivalent spring mechanism, is provided to automatically pivot the eyeglasses support 33 upwardly on hinge 34 into an inclined position relative to cover 22 in which position the spectacles 24 may be easily grasped.

Preferably the eyeglasses holding mechanism A also includes a slot 40 into which the eyeglasses may be slid and retained, the opening 41, of slot 40 facing away from the cover hinge 23 of case 20. An integral extension of the material of eyeglasses support 33 may be bent upwardly and backwardly at 42 to form a retaining stud 43 for the nose bridge 29 of a pair of spectacles. It may then be bent at 44 and 45 to form an upper portion 46 of the support 33 which overlies the nose bridge and forms the slot 40. A guide stud 48 is also formed of the same extension to act as a guide for the bows 25 and 26 of a pair of spectacles and to act as a stop for cover 21 when it is closed on cover 22. By this construction the nose bridge of a pair of spectacles slips behind retaining stud 43 while the folded bows of a pair of spectacles may lie behind guide stud 48 when the spectacles are placed in slot 40. Since the top of guide stud 48 is in the plane of the inside of the cover 21, when the cover 21 is closed, the stud first contacts said cover and prevents the spectacles from engagement with, or damage therefrom in closing.

Preferably also the eyeglasses support 33 is skeletonized, or cut away, so that it takes the outline of, and conforms to the shape of, a typical pair of eyeglasses. As shown, an opening 50 is provided therein, under lens 30, and an opening 51 is provided therein under lens 31. Thus, the lenses 30 and 31 may be wiped clean while still in the support 33 and on both top and bottom thereof, as soon as the cover 21 is opened and support 33 springs into an inclined position. Coil springs 35 is preferably attached to the support 33 at the bend 45 and extends rearwardly and downwardly therefrom to a convenient point of attachment 49 on cover 22 adjacent cover hinge 23.

Spring actuated bow support mechanism B includes a pair of identical bow supports 60 and 61, each pivoted at bow support hinges 62 and 63 located near the terminal portion of the ends 36 and 37 of eyeglasses support 33. Integral upstanding ears 64 and 64 is provided on the ends 36 and 37 and similar downturned ears 65 and 66 are provided on bow supports 60 and 61, to enable hinge pivoting on an axis transverse to case 20. Each bow support 60 and 61 is shaped to extend under one of the bows 25 or 26 of spectacles 24 when the spectacles are resting on eyeglasses support 33 and the bows are folded downwardly. Second spring means 67, or its mechanical equivalent, is provided to continually urge the bow supports 60 and 61 to assume an upright position relative to eyeglasses support 33. As shown, an elongated leaf spring such as 68 has one end 69 attached to the undersurface of support 33, then extends longitudinally around the adjacent end 37 of support 33 as at 70 and its opposite end 71 is attached to the upper surface of a bow support such as 61. Contact of the portion 70 of leaf spring 68 with an end such as 19 of case 20 limits the movement of the bow supports such as 60 and 61.

As mentioned above, the case 20 is preferably slightly wider than required to enclose a pair of spectacles in order to provide space for a pair of strips of lens wiping fabric 80 and 81 and a pair of rolls 82 and 83 upon which such fabric may be rolled and unrolled. As shown, the rolls 82 and 83 each comprise a pair of discs 84 and 85 mounted at opposite ends of a longitudinally extending shaft 86 and shaft 86 is journalled in brackets 87 and 88 attached to cover 22. Discs such as 84 or 85 may be knurled on their circumferential surfaces such as 89, for revolving the same by finger contact or preferably a knob 90 is provided, outside case 20, for rotating the shafts such as 86.

In operation, when cover 21 of case 20 is opened, eyeglasses support 33 automatically rises to an inclined position and bow supports 60 and 61 automatically rise to upright positions ready to receive a pair of spectacles 24. Lens wiper strips 80 and 81 may be entiredly wound on rolls 82 and 83 or may be entirely unwound to overlie support 33 and act as a cushion for the eyeglasses. The eyeglasses 27 are slidably inserted in slot 40, behind retaining stud 43 and under the portion 46 of support 33 which overlies nose bridge 29. The lenses 30 and 31 are over the openings 50 and 51 in support 33, thus providing access thereto for cleaning both top and bottom, and strips 80 and 81 may be turned back to overlie the same. Bows 25 and 26 are then folded downwardly on bow supports 60 and 61 against the spring pressure of springs such as 68, and in rear of guide stud 48, and the eyeglasses 27 are then pushed downwardly on eyeglasses support 33 against the spring pressure of spring 35. Cover 21 is then closed to contact the guide stud 48 and the pressure of the cover hinge spring mechanism holds the spring actuated eyeglasses supports and bow supports in position. Upon opening cover 21, bows 25 and 26 spring upright with bow 60 and 61 while support 33 springs up to an inclined position relative to cover 22. In this position, the spectacles may be immediately removed and donned, or may first be wiped clean by strips 80 and 81. Strips 80 and 81 may be rolled up on rolls 82 and 83 by manually turning knobs such as 90 or knurled discs such as 84 and 85.

I claim:

1. A spectacle case for use with eyeglasses having folding bows, said case comprising a pair of hinged covers for enclosing a pair of spectacles therewithin, an elongated eyeglasses support hingedly pivoted within said case proximate and parallel to the cover hinge thereof, for supporting the undersurface of said eyeglasses; first spring means for automatically pivoting said support into an inclined position relative to one of said covers when the other cover is opened; a pair of oppositely disposed, identical bow supports, each hingedly pivoted to an opposite end of said eyeglasses support, for supporting the undersurface of each of said pair of bows and second spring means for automatically pivoting each bow support into an upstanding position relative to said eyeglasses support when said other cover is opened.

2. A combination as specified in claim 1, wherein said eyeglasses support includes an upper portion, overlying the bridge of a pair of eyeglasses, thereby forming a centrally disposed slot for slidably receiving and retaining a pair of eyeglasses.

3. A combination as specified in claim 1 wherein said eyeglasses support is shaped to conform to the shape of the outline of a pair of eyeglasses with openings therethrough above and below the lenses thereof, to permit wiping a pair of lenses while still in said eyeglasses support.

4. A combination as specified in claim 1 wherein a portion of said eyeglasses support overlies the bridge of said eyeglasses and said first spring means is a tension coil spring leading downwardly and rearwardly from said overlying portion to a plane below said support.

5. A combination as specified in claim 1 wherein said second spring means is a pair of elongated resilient strips of metal, each extending from below said eyeglasses support around the adjacent end thereof and back upon itself to the upper surface of the adjacent bow support.

6. A combination as specified in claim 1 plus a guide stud extending upwardly from said eyeglasses support to the plane of the inside of the adjacent cover when said cover is closed and proximate the path of the bows when folded, thereby forming a guide for said bows and a stop for said closed cover.

7. A combination as specified in claim 3 plus a pair of rolls mounted to rotate within said case on a longitudinal axis extending parallel to the cover hinge thereof and a pair of strips of wiping fabric, each wound on one of said rolls and adapted to be unrolled for use in wiping a lens of a pair of eyeglasses while carried by said eyeglasses support.

8. A spectacle case comprising the combination of a pair of hingedly connected covers shaped to enclose a pair of spectacles; spring actuated eyeglasses holding mechanism within said case, for automatically lifting a pair of eyeglasses to an acute angle with one of said covers when said case is opened; spring actuated bow supporting mechanism cooperable with said eyeglasses holding mechanism, for automatically unfolding the bows of a pair of spectacles when said case is opened; a lens wiper within said case, for cleaning the top and bottom of a lens of said spectacles and mechanism for rolling up said lens wiper into a compact roll extending along an edge of said case.

9. A spectacle case comprising the combination of a pair of hingedly connected covers shaped to enclose a pair of spectacles; an eyeglasses platform pivotally mounted within said case for supporting the undersurface of a pair of eyeglasses; spring means for automatically lifting said eyeglasses platform to an acute angle relative to one of said covers upon the opening of said case; a pair of identical, oppositely disposed bow platforms pivotally mounted within said case for supporting the undersurface of the bows of said spectacles and spring means for automatically raising said bow platforms to a position above said eyeglasses platform upon the opening of said case.

No references cited.